(No Model.)
J. L. BRUCE & T. E. SIKES.
SEED PLANTER.
No. 326,712. Patented Sept. 22, 1885.
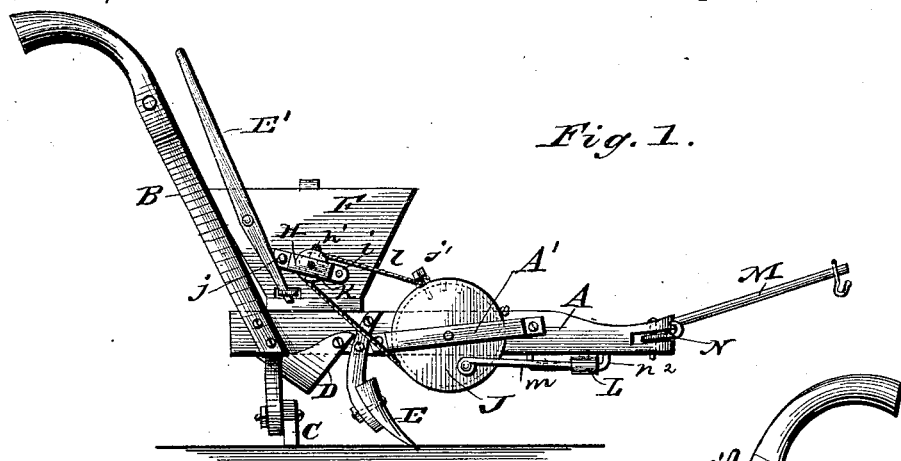
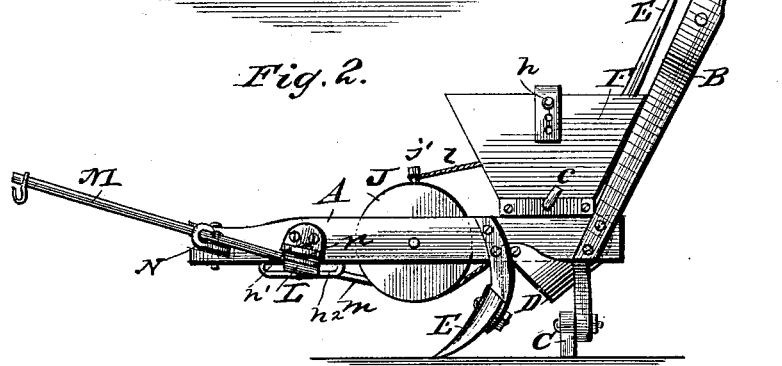
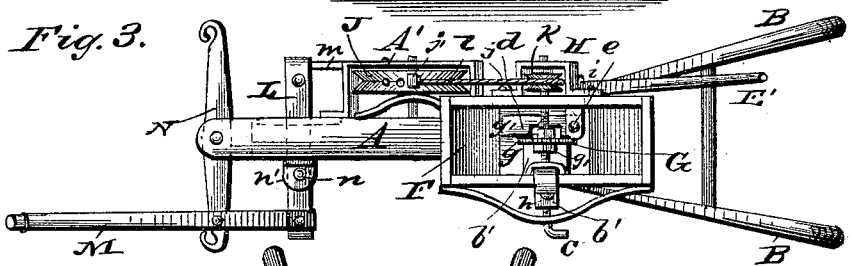
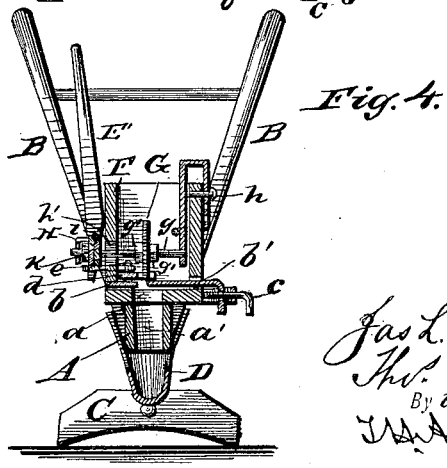
WITNESSES
Phil C. Dieterich
Art E. Dowell
INVENTORS
Jas. L. Bruce
Tho. E. Sikes
By their Attorney
J. H. Alexander

UNITED STATES PATENT OFFICE.

JAMES L. BRUCE AND THOMAS E. SIKES, OF CHAUNCEY, GEORGIA.

SEED-PLANTER.

SPECIFICATION forming part of Letters Patent No. 326,712, dated September 22, 1885.

Application filed December 4, 1884. (No model.)

*To all whom it may concern:*

Be it known that we, JAMES LAFAYETTE BRUCE and T. EUGENE SIKES, of Chauncey, in the county of Dodge and State of Georgia, have invented certain new and useful Improvements in Seed-Planters; and we do hereby declare that the following is a full, clear, and exact description thereof, reference being had to the accompanying drawings, and to the letters of reference marked thereon, which form part of this specification, in which—

Figure 1 is an elevation of the right-hand side of our improved planter. Fig. 2 is a similar view of the left-hand side of the planter. Fig. 3 is a top view; and Fig. 4 is a vertical cross-section taken in the plane indicated by dotted lines $x\ x$, marked on Figs. 1 and 2.

This invention relates to improvements in machines which are designed for sowing and covering guano with or without corn or cotton seeds, and also for planting other seeds; and it consists in novel devices whereby the motion of the horse is caused to actuate the distributer; also, in novel means for making the same machine interchangeable for corn and cotton seeds, and for regulating the feed, all of which will be fully understood from the following description, when taken in connection with the annexed drawings:

The letter A designates the beam of our improved planter, which has plow-handles B B secured to its rear end; also, a coverer, C, a seed-guide, D, and a drill-opener, E. These parts are or may be constructed in the usual well-known manner, and are clearly shown in the drawings hereto annexed.

F designates a hopper adapted to contain the seeds to be sown. This hopper is suitably secured upon the rear part of the beam A just in front of the handles B B. The bottom of the hopper has a slot, $a$, which coincides with an opening, $a'$, through the beam leading to the seed-guide D. On top of the slot $a$, at the bottom of the hopper, is a fixed plate, $b$, and slide $b'$, which latter is adjustable by means of a crank-screw, $c$, for regulating the size of the discharge-opening for the seed. Above this opening is a cut-off gate, $d$, which is vertically pivoted at $e$ and horizontally adjustable by means of a hand-lever, E', having its fulcrum on the outside of the hopper-box. It is by means of the cut-off gate $d$ that the seed-discharge aperture can be increased or diminished in size, according to the quantity of seeds or charge which it is desired to drop in a hill, or according to the amount of seed which it is desired to drop while sowing in drills.

G designates a serrated feed or distributing wheel, which is applied on a horizontal transverse screw-threaded shaft, $g$, and laterally adjustably applied on this shaft by jam-nuts $g'$ $g'$, so that it can be rigidly fixed when properly set with reference to the discharge-apertures above described. One end of this shaft $g$ has its bearing in a vertically-adjustable slide, which is suitably guided on the left-hand side of the hopper and adjustable by means of a set-screw, $h$. The other end of the said shaft passes freely through a segmental slot, $h'$, and has its bearings in a stirrup, H, on the outside of the right-hand end of the hopper. This stirrup is pivoted to the hopper at $i$, and adjustably secured thereto by means of a set-screw, $j$. By these means the shaft $g$ and its distributing-wheel can be adjusted higher or lower and fixed at any desired height with reference to the discharge-apertures. On the outside of the hopper, and keyed on the shaft $g$, is a grooved pinion-wheel, $k$, around which passes a belt, $l$. One end of the belt $l$ is rigidly secured to a grooved disk, J, which has its bearings on the beam A and also on a strap, A', on the right-hand side of the said beam. The other end of the belt $l$ is attached to a key or screw, $j'$, which is inserted in a hole in the periphery of the disk J. By turning the key $j$ the belt may be tightened at pleasure. The disk J has pivoted eccentrically to its face one end of a pitman-rod, $m$, the opposite end of which is pivoted to a lever, L, which has its fulcrum at $n$ on an offset, $n'$, on the bottom of the beam A, forward of the hopper, and is guided by a long staple, $n^2$. The left-hand end of the lever L has pivoted to it a rigid draw-bar, M, which extends forward of the beam A on the left-hand side of the implement, and has a hooked device applied to it adapted to be engaged with a trace of the harness. This bar M is pivoted to the single-tree N, which latter is pivoted to the beam A, or it may be pivoted to a clevis, if desired.

It will be seen from the above description, first, that the serrated distributer is bodily adjustable by the special means explained, and that in connection with this adjustment the driving-belt is provided with a tension device which is also adjustable for compensating for the adjustment of the said distributer. It will also be seen that the movements of the animal drawing the machine will be transmitted through one of the harness-traces to an oscillating disk which actuates the distributer.

We are aware that it is not new to connect with the front leg of an animal a flexible strap which will by the movement of the animal actuate a distributer, and therefore disclaim such a contrivance.

By means of the rigid connection which we employ we obtain a positive forward and backward motion of the distributing attachment, whereas with a flexible attachment to the animal only a forward jerking motion is obtained.

Having described our invention, we claim—

1. The combination, in a planter, of a rigid bar adapted to be secured to the harness of a draft-animal, said bar being pivoted to the single-tree and to a lever which is connected to an oscillating disk, and the belt attachment of the disk with a pulley on the shaft of the distributer, substantially as described.

2. The combination of the draft-bar, the single-tree, the lever to which this bar is connected, the oscillating disk and its pitman connection to said lever, the belt applied to the disk and to the pinion on the shaft of the distributer, and means for adjusting the latter vertically, substantially as described.

3. The combination, with the hopper of a seed-distributer, of a vertically and laterally adjustable seed-distributer actuated by the movement of the animal, as described, and a tension device for the belt of the oscillating disk and pulley, substantially as specified.

4. In a seed-planter, the oscillating disk and draft device, in combination with a tension device applied to the periphery of said disk, and a driving-band adapted for regulating the oscillations of the seed-distributer, substantially as described.

5. The combination, in a seed-planter, of the following elements, to wit: a beam provided with handles, a hopper, a seed-guide, a shovel, and a coverer, with a single-tree having pivoted to it a draft-bar, a cross-lever pivoted to said bar and connected to an oscillating disk, and a seed-distributer which is driven by means of a belt connected to said disk and provided with a tension device, all constructed and adapted to operate substantially in the manner and for the purposes described.

In testimony that we claim the foregoing as our own we affix our signatures in presence of two witnesses.

J. L. BRUCE.
T. E. SIKES.

Witnesses:
WM. SANDERS,
H. W. CARSWELL.